June 18, 1968  I. JEPSON ET AL  3,389,323
ELECTRICALLY OPERATED DRY SHAVER
Original Filed Jan. 5, 1965  5 Sheets-Sheet 1
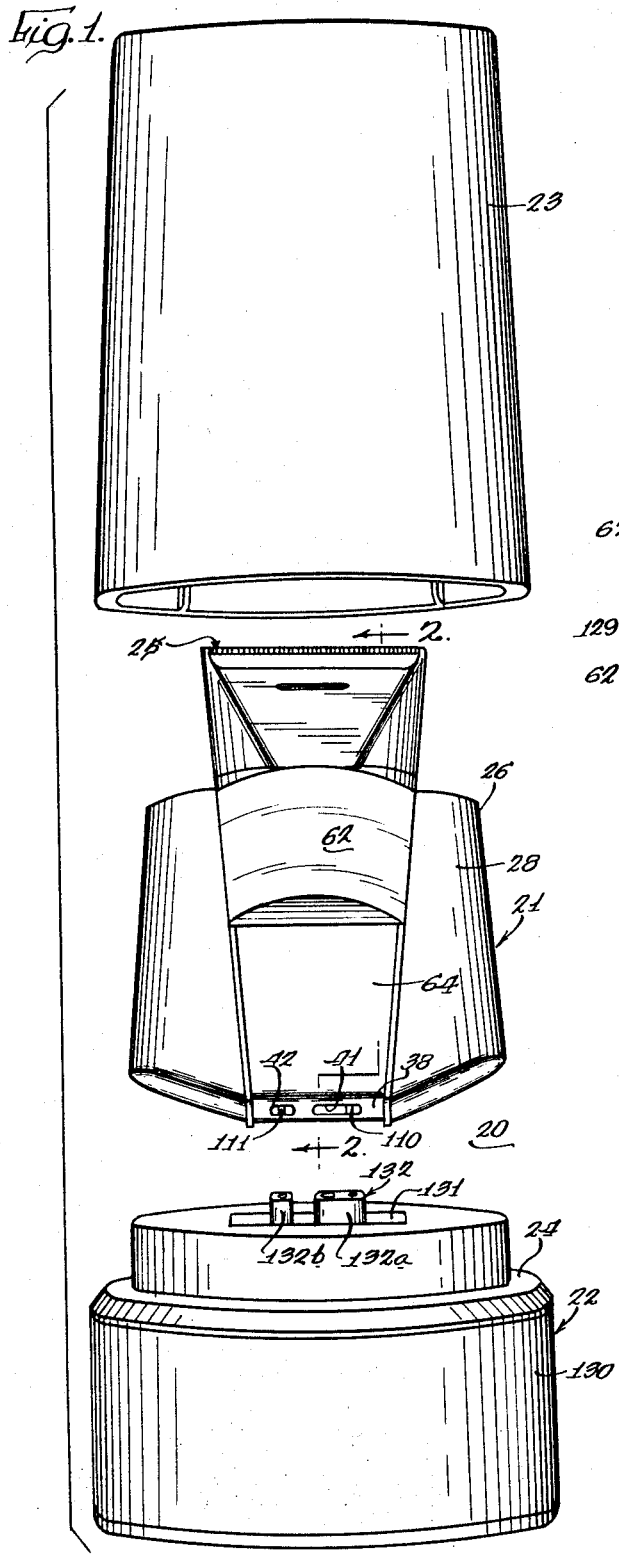
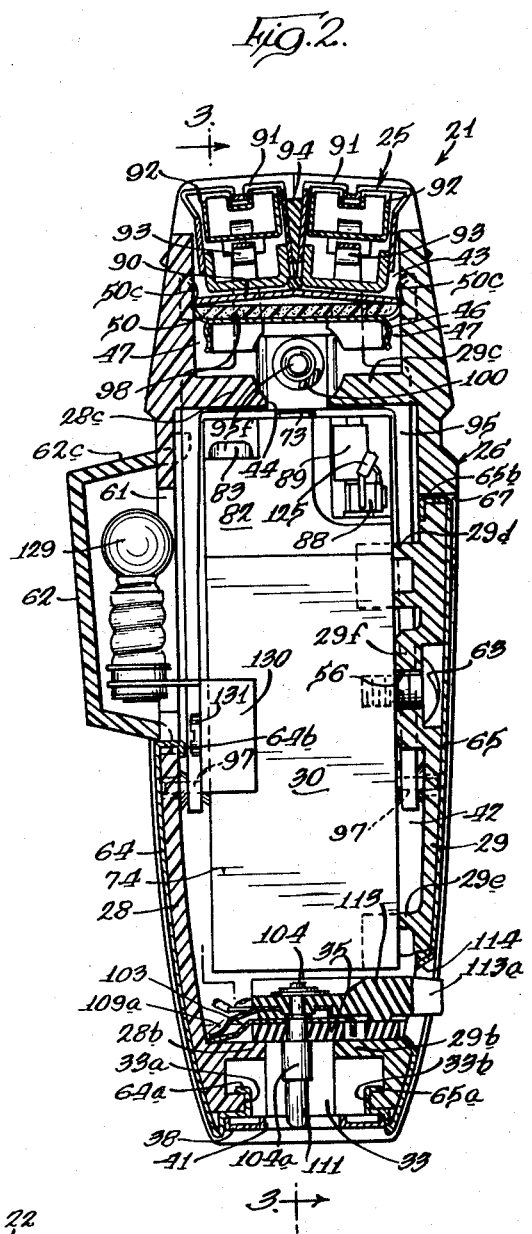
Inventors
Ivar Jepson
Leon M. Roszyk
Daniel E. Stahly
By George R. Clark Atty

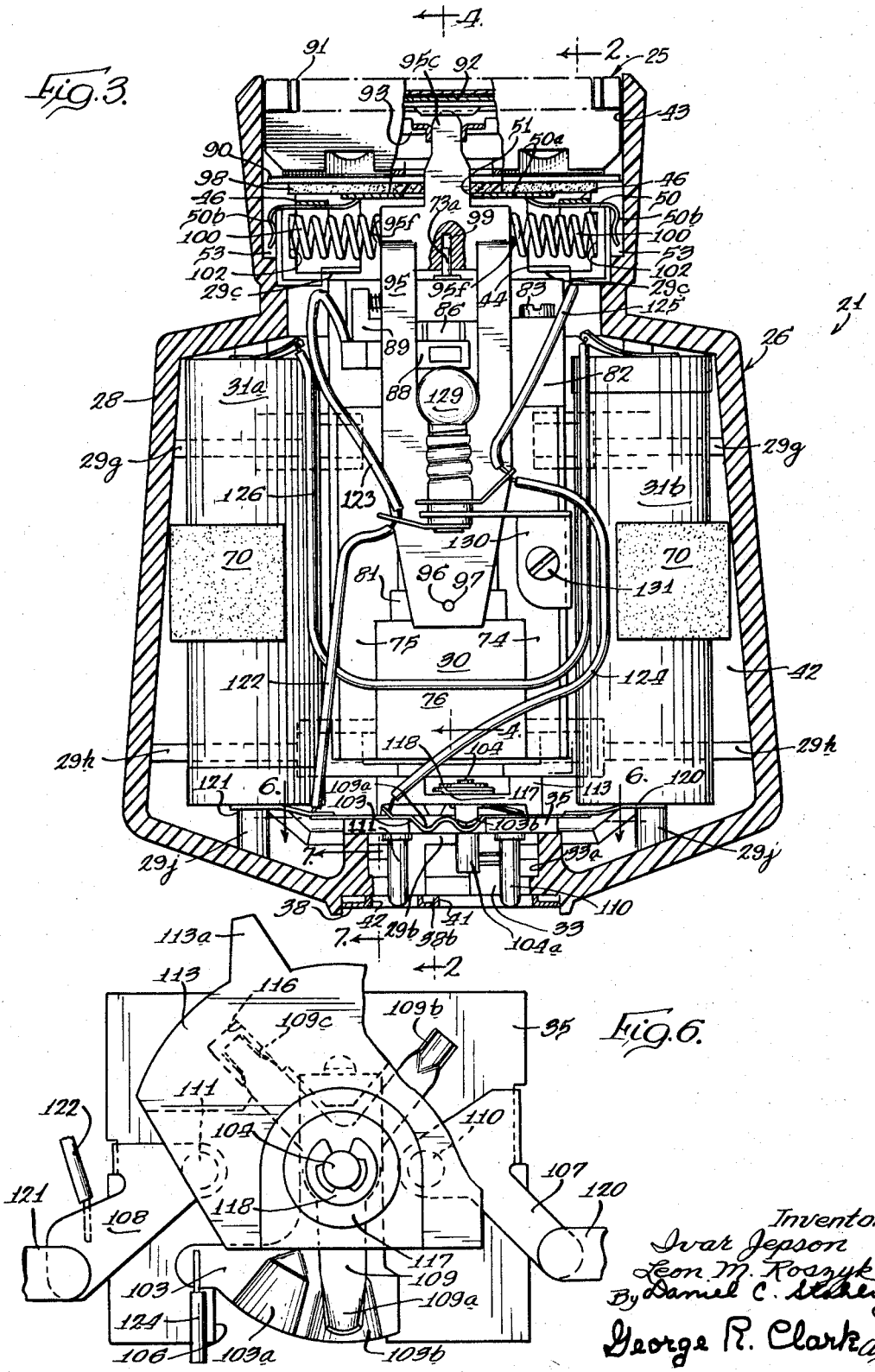

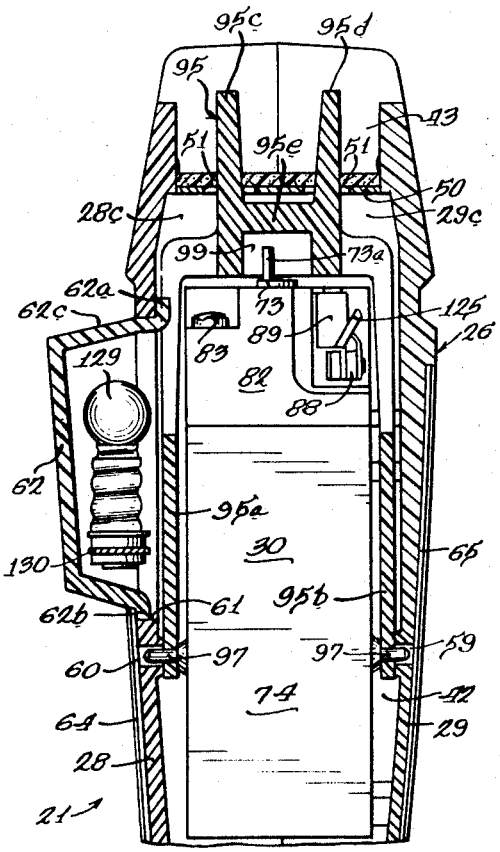
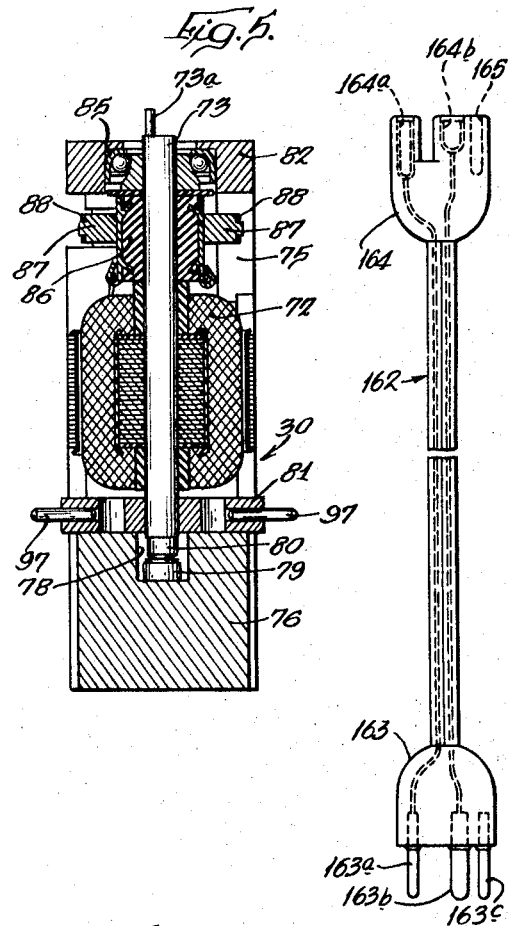
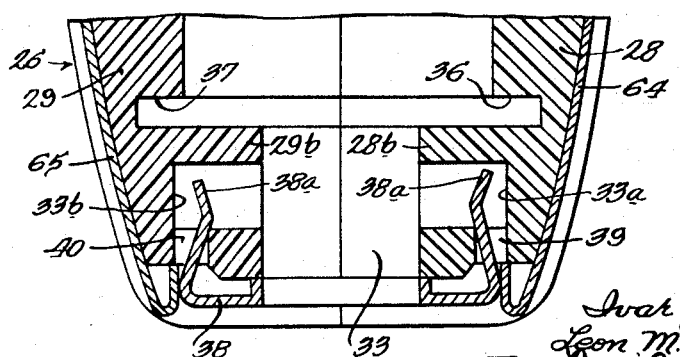

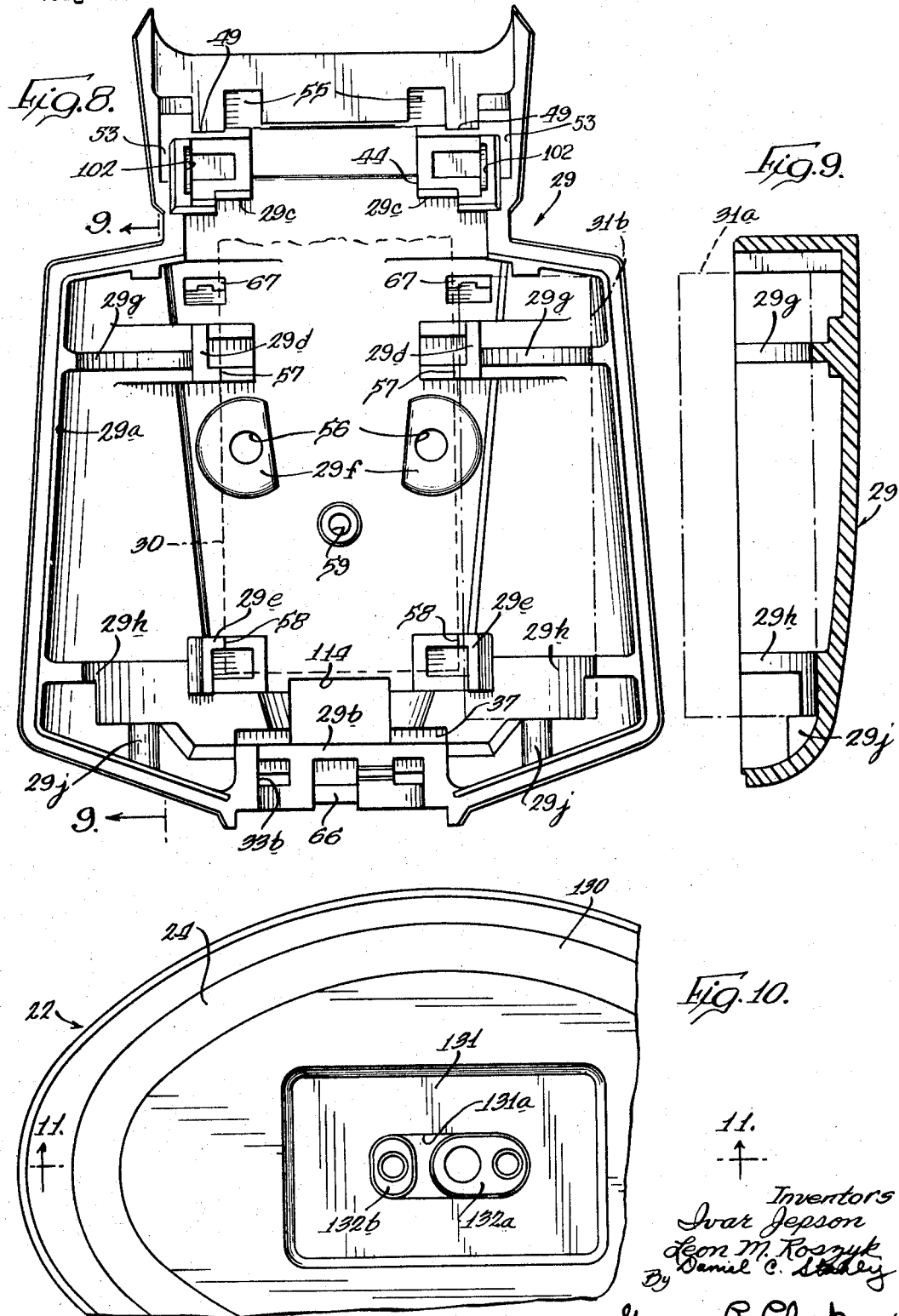

June 18, 1968   I. JEPSON ET AL   3,389,323
ELECTRICALLY OPERATED DRY SHAVER
Original Filed Jan. 5, 1965   5 Sheets-Sheet 5
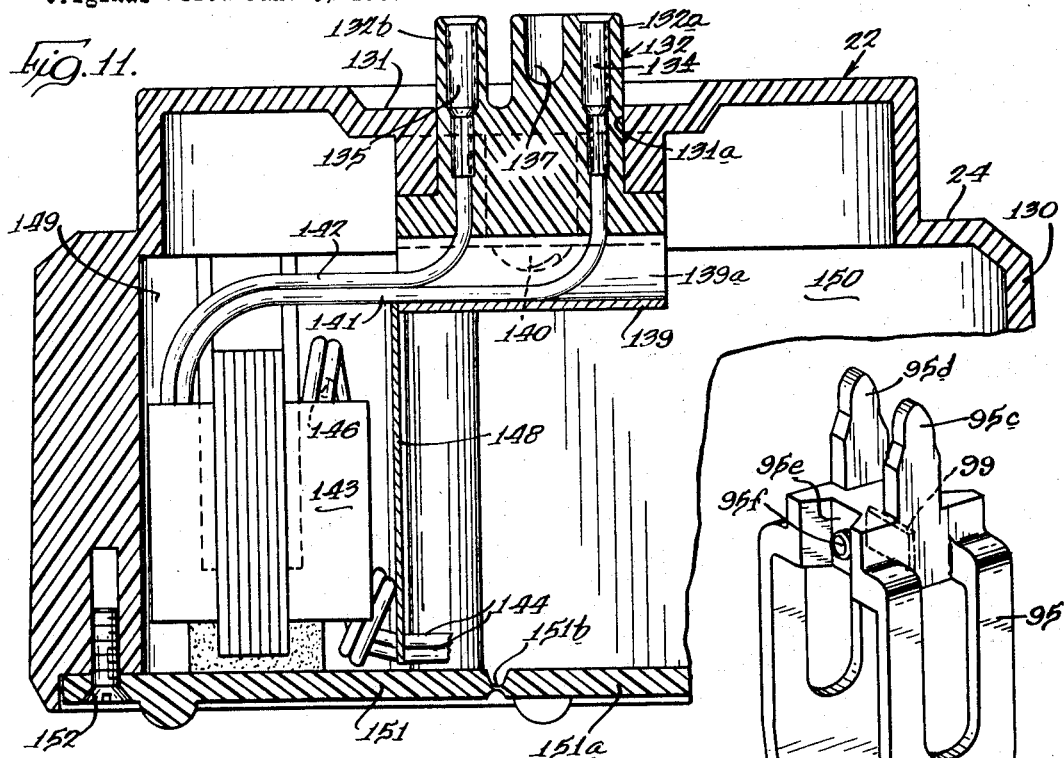
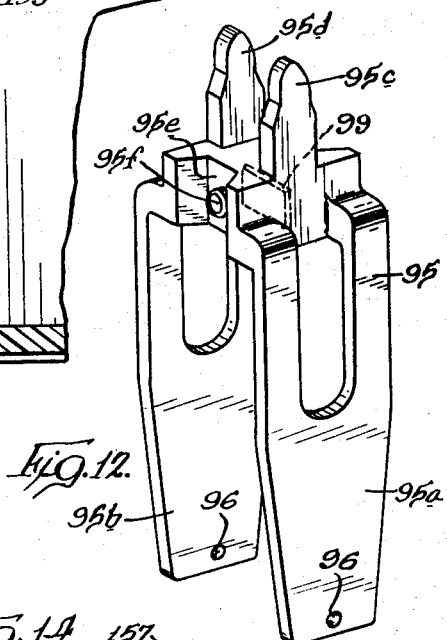
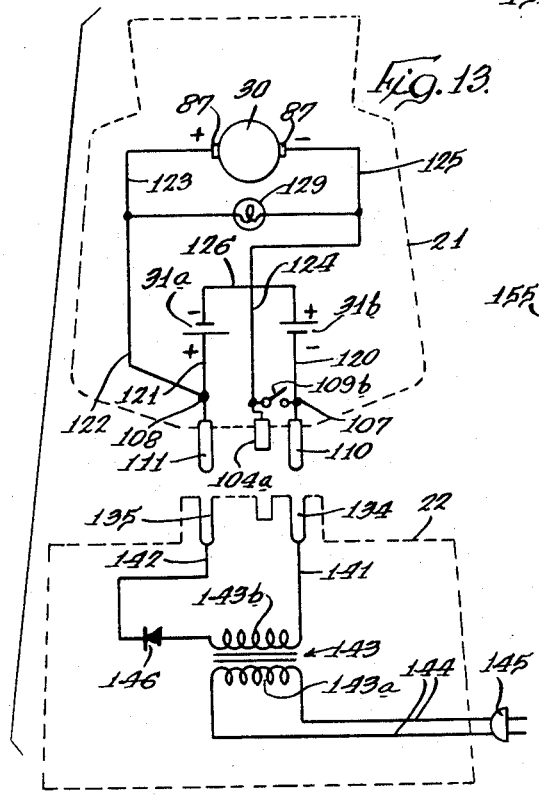
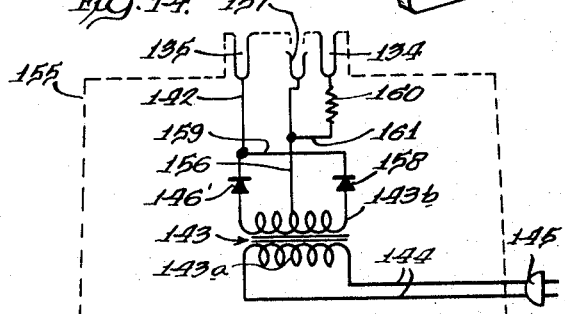
Inventors:
Ivar Jepson
Leon M. Rosryk
By Daniel C. ...
George R. Clark Atty

United States Patent Office 3,389,323
Patented June 18, 1968

3,389,323
ELECTRICALLY OPERATED DRY SHAVER
Ivar Jepson, South Duxbury, Mass., and Leon M. Roszyk, Berwyn, and Daniel C. Stahly, Villa Park, Ill., assignors to Sunbeam Corporation, Chicago, Ill., a corporation of Illinois
Original application Jan. 5, 1965, Ser. No. 423,464. Divided and this application Dec. 23, 1965, Ser. No. 515,905
2 Claims. (Cl. 320—5)

ABSTRACT OF THE DISCLOSURE

Rechargeable battery operated shaver with a separate power unit and a separate charging unit wherein the power unit is both mechanically supported and electrically connected to the charging unit by the mere placing of the former on the latter. Additional conductor means are provided to permit the power unit to be energized directly from the charging unit in the event the batteries are discharged.

---

This application is a division of copending Jepson et al. application Ser. No. 423,464, filed Jan. 5, 1965. The present invention relates to electrically operated dry shavers and, more particularly, to such shavers wherein the power source is a rechargeable battery. Furthermore, the present invention is concerned with such shavers designed primarily for use by women.

During the last decade the sale of electric dry shavers for women has increased tremendously. The first electric dry shaver exclusively designed for women is disclosed and claimed in Jepson et al. Patent No. 3,072,809, assigned to the same assignee as the present application. Since the advent of the shaver shown in this Jepson et al. patent, women throughout the world have begun to appreciate the advantages of an electric shaver for removal of hair as compared to the conventional safety razor, depilatories or other means which had formerly been used. Increased use of electric dry shavers by women has caused them to become more demanding in the performance of women's electric shavers, and they have come to expect the same shaving performance from such a shaver as had formerly been available only in the most expensive men's electric shavers. Moreover, women expect electric dry shavers designed exclusively for women to be such as to satisfy their requirements and not to comprise merely men's electric shavers modified in styling aspects.

Women's shavers are used primarily for removing leg and underarm hair, and this means for such use the electric shaver must be lighter in weight and easier to manipulate than a man's shaver which is used only over a limited area of the face and neck. Additionally, the head of an electric shaver designed for women must be considerably smaller so that it may be conveniently used in the underarm area. Unlike an electric shaver for men which is used one or more times a day, the women's dry shaver is used only once or twice a week, and thus women are reluctant to purchase electric shavers which are as expensive as the highest quality men's shaver on the market today. The demand for lightweight, high performance and low cost electric women's shavers has resulted in extensive research and development. Heretofore, in order to maintain the size and cost at a minimum, a vibrator type motor has primarily been used in dry shavers for women whereas the higher priced, more satisfactory men's shavers have been powered by rotary commutator type motors. It would be desirable to provide in a very small, compact and yet inexpensive women's shaver a rotary commutator type motor thereby eliminating the excessive vibration which often accompanies the operation of a vibrator type motor.

The women's electric shaver has become a necessity rather than a luxury. Moreover, since people are beginning to travel a great deal, the electric shaver accompanies the woman in her travels throughout the world. It is a well-known fact that the sources of electricity throughout the world vary, both as to voltage frequency and the particular type of electrical connections, and the conventional electric shaver which is plugged into a wall outlet is not adapted for universal use. Consequently, it would be desirable, without increasing the small size which has come to characterize the women's dry shaver, to provide a battery operated shaver capable of operating over long periods of time without recharging so that it may be taken on trips to any foreign country. It would also be desirable to provide means for periodically recharging the batteries of such shavers and the shaver and the recharging means should have a pleasing appearance so that it will be an ornament on a dressing table or the like.

Accordingly, it is an object of the present invention to provide a new and improved shaver for women which has the desirable features set forth above.

It is another object of the present invention to provide an improved dry shaver for women powered by a rotary commutator type electric motor which produces a minimum of vibration effects in the hand of the user.

It is a further object of the present invention to provide a battery operated electric dry shaver for women which may be utilized over long periods of time without recharging the battery and which has the same compact size in spite of the provision of the battery which has come to characterize the small, compact ladies' shaver.

It is another object of the present invention to provide a battery operated electric dry shaver for women which includes charging means for periodically recharging the batteries but which also permits the shaver to be operated directly from a source of alternating current power.

Still another object of the present invention resides in an improved electric dry shaver for women powered by rechargeable batteries in which both the shaver and the charging unit are compact, pleasing in appearance, foolproof in performance and inexpensive to manufacture.

Further objects and advantages of the present invention will become apparent as the following description proceeds, and the features of novelty which characterize the invention will be pointed out with particularity in the claims annexed to and forming a part of this specification.

For a better understanding of the present invention, reference may be had to the accompanying drawings in which:

FIG. 1 is an exploded perspective view of the electric shaver of the present invention showing the power unit, the charging unit and cover;

FIG. 2 is an enlarged sectional view of the power unit taken substantially on line 2—2 of FIGS. 1 and 3;

FIG. 3 is a sectional view of the powder unit taken substantially on line 3—3 of FIG. 2 assuming that FIG. 2 shows the complete structure;

FIG. 4 is a fragmentary sectional view taken on line 4—4 of FIG. 3 assuming that FIG. 3 shows the complete structure but with the electric motor shown intact;

FIG. 5 is a sectional view of the electric motor only taken substantially on line 4—4 of FIG. 3;

FIG. 6 is an enlarged fragmentary view primarily of the switch mechanism incorporated in the power unit looking in the direction of the arrows 6—6 of FIG. 3 assuming FIG. 3 shows the complete structure, the switch contacts of the switch mechanism being shown in the open position;

FIG. 7 is a fragmentary sectional view taken on line 7—7 of FIG. 3 assuming that FIG. 3 shows the complete structure;

FIG. 8 is a plan view showing the inside of one of the casing sections of the power unit with dotted lines indicating the positions that the motor and batteries would assume in this casing section;

FIG. 9 is a fragmentary sectional view taken on line 9—9 of FIG. 8 again illustrating in dotted lines the position that would be assumed by one of the batteries;

FIG. 10 is an enlarged fragmentary top view of the charging unit of the electric shaver shown in FIG. 1 of the drawings;

FIG. 11 is a sectional view taken on line 11—11 of FIG. 10 assuming that FIG. 10 shows the complete structure;

FIG. 12 is a perspective view of the novel drive arm employed in the power unit of FIG. 1;

FIG. 13 is a schematic diagram illustrating the electrical circuit in the power unit and charging unit of the shaver shown in FIG. 1 of the drawings;

FIG. 14 is a schematic diagram of a modified charging unit that permits the power unit to be alternatively operated directly from a source of alternating current potential or from the batteries; and FIG. 15 is a somewhat schematic diagram of a special cord unit for use with the modification of FIG. 14.

Briefly, the present invention is concerned with a so-called cordless or battery operated electric dry shaver and particularly an electric dry shaver designed for use by women. A very compact casing which can be readily handled by women who use an electric shaver is designed to house a powerful rotary electric motor and also two batteries connected in series. An improved arrangement of the elements in the casing and also a novel drive arm for transmitting motion from the rotary motor to the reciprocating cutters is provided. The shaver is provided with a charging stand for recharging the batteries periodically and a modified charging unit is disclosed wherein the shaver may be operated directly from a source of alternating potential. An improved spring biasing arrangement is also employed in the power unit and, by virtue of the present invention, all the shaver parts can readily be manufactured and assembled in a simple manner.

Referring now to the drawings, the present invention is illustrated as embodied in an electric dry shaver assembly generally designated by the reference numeral 20 in FIG. 1. This shaver assembly comprises a power unit 21, a charging unit 22 and a cover 23. As will become apparent from the ensuing description, the power unit 21 comprises a self-contained electric shaver particularly designed for use by women which may readily be held in the much smaller hand which women normally have and which may perform a complete shaving operation without the necessity of connecting the same to a source of power. The charging unit 22, on the other hand, is a unit with which the power unit 21 is associated to recharge the batteries contained in the power unit from a source of electrical energy. The charging unit 22 is so designed that the power unit 21 may be suitably supported thereon during a charging operation, and the charging unit is provided with a shoulder portion 24 for engaging the rim surrounding the open bottom of the cover 23. This cover 23 with charging unit 22 defines an enclosure of pleasing appearance, housing the power unit during the charging operation, which may be disposed somewhat like an ornament on a dresser or any other suitable exposed shelf in the bedroom and bathroom.

Considering now the power unit 21 in more detail, it comprises a cutting head assembly (FIG. 2) generally designated as 25 mounted along one edge of a housing or casing 26 defined by a pair of somewhat symmetrical casing halves designated as 28 and 29, respectively, which abut along a plane which passes through the center of the casing 26. This casing 26 encloses a rotary electric motor 30 and a pair of identical rechargeable nickel cadmium batteries or cells designated as 31a and 31b, which cells are connected in series.

Considering first the casing or housing 26, it is evident from FIGS. 1, 2 and 3 that the housing 26 is somewhat flat, as seen in a side view, and more or less trapezoidal in shape when considering the front or rear profile thereof. Adjacent the top thereof the casing is narrowed to accommodate the cutting assembly 25 so that it provides as little obstruction as possible to the use of the cutting head in he underarm area. Additionally, the casing shape is such that it may easily be held in the hand of the user. The casing or housing sections 28 and 29 might be designated as the front and rear housing sections, respectively. As illustrated in the drawings, the housing sections 28 and 29 are somewhat cup or disk-shaped with the mating edges defined with cooperating interlocking portions to provide a tight junction of the housing sections along their parting lines and assure that they will be assembled in proper alignment. In a device built in accordance with the present invention, the housing section 29, as best shown in FIG. 8 of the drawings, is provided with an integral projecting lip 29a at the parting line thereof which overlaps with a corresponding lip 28a (not shown) on the casing section 28.

In order to permit a power connection to be made for charging the batteries 31a and 31b or alternatively to energize the motor 30, each of the housing sections 28 and 29 is provided at the lower end with complementary notches 33a and 33b (FIGS. 2, 3, 7 and 8) which when the casing sections 28 and 29 are assembled provide a recess 33 within which rigid male bayonet type electric terminals for the shaver are disposed, as described hereinafter, permitting electrical connection with an outside power source readily to be made in a manner well understood by those skilled in the art. Each of the casing sections 28 and 29 is provided with an inwardly projecting integral shelf defining portion 28b and 29b, respectively, effectively defining the top of the recess 33 and defining a shelf upon which is supported an insulating switch board 35, best shown in FIGS. 2, 3 and 6 of the drawings. This insulating switch board is of generally rectangular configuration and to insure that it is rigidly held in position on the shelf defined by projections 28b and 29b so as to define the top of the recess 33, each of the casing sections is provided with a groove designated as 36 in the case of casing section 28 and 37 in the case of casing section 29 (FIGS. 7 and 8). The insulating switch board 35 is thereby effectively clamped or trapped in these grooves when the casing sections are assembled in mating relationship.

In order to hold the lower portions of the casing sections 28 and 29 in mating relationship with the lips 28a and 29a overlapping and to provide the lower end of recess 33 with a pleasing appearance, there is preferably provided an interlocking clip 38 (FIGS. 1, 2, 3 and 7 of the drawings) which, in a device built in accordance with the present invention, was provided with a plurality of integral spring fingers 38a (FIG. 7) receivable in suitable openings 39 and 40 defined in the portions 28b and 29b of casing sections 28 and 29. For a purpose described hereinafter, this spring clip 38 is provided with two openings of different size 41 and 42 (FIGS. 1 and 3) separated by a petition portion 38b integral with the spring clip 38.

For the purpose of performing various important functions and also to separate the housing into a motor and battery chamber 42 and a cutter chamber 43, the casing sections 28 and 29 are provided with inwardly directed projections 28c and 29c, respectively, (FIGS. 2, 3, 4 and 8) which when the casing sections 28 and 29 are assembled define an opening 44 therein interconnecting the motor chamber 42 and the cutter chamber 43. A portion of opening 44 is clearly illustrated in FIG. 8 of the drawings between the projections 29c. The top of the projections 28c and 29c define a sort of shelf interrupted by the opening 44 but which shelf defines the bottom of the cutter chamber 43.

For the purpose of holding the top of the casing sections 28 and 29 in assembled relationship, a pair of upper housing U-shaped spring clamps 46, as best shown in FIGS. 2 and 3 of the drawings, are provided. The arms of these upper housing clamps 46 are receivable in suitable openings 47 (FIG. 2) defined in the projections 28c and 29c. If desired, the top of the shalf defined by the projections 28c and 29c may be provided with a shallow recess 49 (FIG. 8) to receive the upper housing clamps 46 so that the tops of the clamps are flush with the shelf defining the bottom of the cutter chamber 43.

To hold the cutting head assembly 25 within the cutting chamber 43 there is provided a head spring 50 (FIGS. 2, 3 and 4) which is adapted to be supported on the shelf formed by the projections 28a and 28c beneath clamps 46. This head spring 50 includes a flat central section 50a overylying the opening 44. This section 50a has one or more openings such as 51 (FIGS. 3 and 4) therein to accommodate drive means for transmitting the motion produced by the motor 30 within the motor chamber 42 to the cutting head assembly 25, as described in greater detail hereinafter. In order to reinforce the walls of casing 26 to accommodate certain biasing springs described hereinafter, the flat central portion 50a of head spring 50 is provided with spring finger extensions 50b (FIG. 3) at either end, which extensions are receivable in openings 53 defined in the casing 26 when the casing sections 28 and 29 are assembled. The spring finger extensions 50b are disposed beneath the upper housing clamps 46, as best shown in FIG. 3 of the drawings. Integrally formed with the head spring 50 are a plurality of resilient latching arms 50c (FIGS. 2 and 3), two such latching arms being provided on either side of the head spring 50, as best shown in FIG. 3 of the drawings. These latching arms 50c are to releasably latch the cutting head assembly 25 within cutter chamber 43. The casing sections 28 and 29 are preferably provided with recessed portions 55 (best shown in FIG. 8 of the drawings with respect to casing section 29) for receiving the spring fingers 50c and permitting them to be depressed during a latching and unlatching operation with respect to the cutting head assembly 25, as will become apparent from the ensuing description.

In order to support the motor 30 within the housing or casing 26, the rear casing section 29 is provided with inwardly directed pairs of projections 29d and 29e defining somewhat L-shaped shoulders 57 and 58, respectively, for engaging three sides of the motor 30 which is shown in dotted lines in FIG. 8 to show the position thereof. Integral raised projections 29f having openings 56 therein are also provided to engage the rear side of the motor 30 (FIG. 2) and are cut away on the insides, as best shown in FIG. 8 of the drawings so as not to interfere with oscillating motion of the drive means, described in detail hereinafter. Suitable fastening means 63 (FIG. 2) extend through openings 56 and threadedly engage motor 30 to hold it securely in casing section 29. Casing section 29 is further provided with means defining an opening 59 (FIGS. 4 and 8) for receiving a pivot pin about which the drive means oscillates, as described hereinafter. A similar opening 60 is provided in casing section 28 in a diametrically opposed relationship to the opening 59, as best shown in FIG. 4 of the drawings. To provide for illuminating the area being shaved, the front casing section 28 is also provided with a large opening 61 to accommodate a cup-shaped lens 62 whereby, as described hereinafter, a suitable light may be incorporated therein. The lens 62 is preferably formed of a suitable generally transparent molded plastic which is provided with integral projections 62a and 62b (FIG. 4) so that it may be pressed into the opening 61 and retained in position. The lens 62 may have the major surface thereof coated with suitable decorative material and only a portion of the upwardly directed surface designated as 62c in FIGS. 2 and 4 of the drawings uncovered through which light may be projected toward the shaving area.

For decorative purposes, as well as to hide fastening means 63, and as illustrated in the drawings, the central portions of the exterior of casing sections 28 and 29 are provided with raised sections, the boundaries of the raised sections being determined by raised ribs between which decorative metal strips such as 64 associated with the casing section 28 and 65 associated with the casing section 29 are provided (FIGS. 2, 4 and 7). These decorative strips are preferably held in place at the lower end thereof by suitable tabs 64a and 65a, respectively, (FIG. 2) which engage suitable notches or recesses similar to the recess 66 (FIG. 8) provided in the casing section 29. An identical recess is provided in the casing section 28. The upper ends of these decorative metal plates 64 and 65 are preferably also provided with tabs 64b and 65b, respectively, (FIG. 2) receivable in suitable openings such as 67 in casing section 29, best shown in FIG. 8 of the drawings, and similar opening defined in casing section 28.

In accordace with the preset invention and in order to support the batteries 31a and 31b, the housing section 29, as best shown in FIGS. 8 and 9, is provided with upper curved raised rib portions 29g on either side thereof which have an accurate configuration so as to conform to the cylindrical surface of the exterior of the batteries 31a and 31b. Similar raised ribs 29h are provided adjacent the lower end of casing section 29 and projecting posts 29j beneath the curved ribs 29h are designed to engage and support the bottoms of the batteries 31a and 31b, as clearly shown in FIG. 9, where the battery 31a is shown in dotted lines and also in FIG. 3 where the supporting posts 29j are clearly shown engaging the lower ends of the batteries 31a and 31b. To further support the batteries 31a and 31b on either side of the motor 30, there are provided resilient pads or supports 70, best shown in FIG. 3 of the drawings, which are preferably compressed between the exterior surface of the batteries 31a and 31b and the interior of the front casing section 28 when the casing 26 is fully assembled.

The motor 30 is a direct current battery operated motor of the rotary type of very small size to be accommodated within the small casing required. Preferably the motor is substantially identical with that disclosed in copending Jepson and Roszyk application, Ser. No. 295,028, filed July 15, 1963, and assigned to the same assignee as the instant application. The motor, however, is orientated quite differently in the instant application than in the copending Jepson and Roszyk application. In fact the motor armature shaft described hereinafter is disposed in spaced parallel relationship with the longitudinal axes of the batteries 31a and 31b. As best shown in FIGS. 2, 3, 4 and 5 of the drawings, the motor 30 comprises an armature 72, the diameter of which substantially determines the dimensions of the motor. Armature 72 is supported by an armature shaft 73 which is disposed in a vertical direction when the casing 26 is in the position indicated in FIGS. 1 or 2 of the drawings. The motor 30 comprises a pair of substantially identical pole pieces 74 and 75. The field structure also includes a permanent magnet 76 (FIGS. 3 and 5) connected to the pole pieces so as to produce a magnetic field between the pole pieces 74 and 75 which receive the armature 72 therebetween. To support the magnet end of the armature shaft 73, the permanent magnet 76 is provided with a notch 78 for receiving therein an axial load spring 79 and an end thrust bearing 80. Additionally, a sintered bronze bearing 81 is provided which is secured to the field structure comprising the pole pieces 74 and 75 and the magnet 76 by a suitable adhesive such, for example, as an epoxy resin or the like.

To support the other end of the armature shaft 73 there is provided a combined bearing and brush support 82 adapted to be clamped to the ends of the pole pieces 74 and 75 remote from the magnet 76 by suitable fastening means such as screws (FIGS. 2, 3, and 4). The combined brush and bearing support 82 is preferably molded from a suitable plastic and is adapted to support a ball bearing unit 85 (FIG. 5) within a suitable recess defined in element 82. The motor shaft 73 extends through the combined bearing and brush support 82, as best shown in FIG. 5 of the drawings, and terminates in an eccentrically disped crank pin 73a. Also supported on the shaft 73 is a commutator 86 which is engaged by suitable brushes 87 held in position by suitable brush holders 88 and brush supports 89 (FIGS. 2, 3 and 4 of the drawings) which are preferably identical with those disclosed in the above-mentioned copending Jepson and Roszyk application. The two brush holders 88, only one of which is shown in the drawings, also comprise the terminals for the motor to which direct current power is supplied, as disclosed in greater detail hereinafter.

Before considering the drive means for transmitting power from the motor 30 to the cutting head assembly 25, a brief description is desirable of the cutting assembly which is preferably substantially identical with that disclosed in copending Spohr application, Ser. No. 286,248, filed June 7, 1963, now Patent 3,218,708 granted Nov. 23, 1965, and assigned to the same assignee as the present application. Briefly, the cutting head assembly comprises a head supporting plate 90 to which are secured a pair of combs 91 of hollow rectangular construction to receive therein reciprocating cutters 92 which are biased into cutting engagement with the cutting surface of the combs 91 by suitable springs 93. Preferably, a suitable hair stop 94 (FIG. 2) is interposed in the space between the combs 91 to prevent hair or clippings from entering this space. The plate 90 is preferably provided with suitable openings aligned with the openings 51 in the plate 50 to permit driving means to engage the cutters 92 in a well-understood manner to reciprocate the latter. The cutting head assembly 25 is adapted to be disposed in the cutting chamber 43 and the edges of the head bracket 90 are adapted to be engaged by the spring fingers 50c, as best shown in FIG. 2 of the drawings, to releasably retain the cutting head assembly 25 within the chamber 43. Preferably, a suitable resilient pad 98 formed of a polyurethane foam or similar material is interposed between the cutting head assembly and the means defining the bottom of the cutting chamber 43. This pad is preferably provided with openings conforming closely to the driving means described hereinafter and will also function as a hair stop to prevent clippings from entering the motor chamber 42 in a manner well understood by those skilled in the art.

In accordance with the present invention and as best shown in FIGS. 3, 4 and 12 of the drawings, there is provided a novel and improved drive means for transmitting rotary motion of the armature shaft 73 of motor 30 to reciprocating motion of the cutters 92. To this end there is provided a yoke member generally designated as 95 preferably formed of a molded material such as nylon or the like. The yoke 95 is of somewhat H-shape having two long lower legs (FIG. 12) designated as 95a and 95b each provided with an opening 96 therein which opening is adapted to receive the ends of suitable identical pivot pins 97 supported by the lower bearing 81 of the motor 30, as best shown in FIGS. 4 and 5 of the drawings. The legs 95a and 95b are disposed in spaced parallel relationship so as to receive therebetween a substantial portion of the motor 30, as best shown in FIGS. 3 and 4 of the drawings. The yoke 95 further includes a pair of upwardly extending arms 95c and 95d which are identical and, moreover, are disposed in spaced parallel relationship. Arms 95c and 95d are spaced drive arms which are adapted to extend through the opening 44 defined in the casing 26 and openings such as 51 defined in the head spring 50 as well as through suitable openings in the head pad 98 and similar openings in the head bracket 90. Yoke 95 is also provided with a crossbar 95e interconnecting the lower ends of the spaced parallel arms 95c and 95d and the upper ends of the long downwardly directed arms 95a and 95b. The lower surface of the crossbar 95e is provided with a narrow elongated slot designated as 99 (FIGS. 3, 4 and 12) to receive therein the crank pin or eccentric 73a thereby causing oscillation of the yoke 99 about the pivot pins 97 upon rotation of the armature shaft 73.

For the purpose of biasing the yoke 95 to its central position, spring means are provided including a pair of springs 100, FIGS. 2 and 3 of the drawings. These springs are compression springs and, as illustrated, are axially arranged with adjacent ends engaging opposite sides of the crossbar member 95e of the yoke 95. To hold these adjacent ends in position, crossbar 95e is provided with somewhat conical integral protuberances 95f at either side thereof (FIGS. 2, 3 and 12) to be received within the hollow ends of the coiled compression springs 100. The other ends of these springs are supported within cooperating recesses 102 defined within the casing 26, as clearly shown in FIG. 3 of the drawings. The spring engaging portions of these recesses are reinforced by the spring finger extensions 50b described above. These springs 100 are preferably tuned to a predetermined frequency to lessen the amount of power necessary to reciprocate the cutting heads 92.

It will be understood that in order to energize the motor 30 from the batteries 31a and 31b an electrical circuit must be provided and also suitable switch means are necessary to terminate the energization of the motor 30 when the hair removing operation has been completed. In accordance with the present invention, the insulating switch board 35, as best shown in FIGS. 2, 3 and 6, supports in fixed position a contact detent 103 which is suitably riveted to the insulating switch board 35 by means of a pivot pin 104 which has a portion 104a projecting into recess 33. Preferably, the insulating switch board is notched as indicated at 106 to permit the detent portion of contact detent 103 to depend therein, the detents being somewhat arcuately arranged and designated as 103a and 103b. Also secured to the insulating board 35 are a pair of terminals 107 and 108, the terminal 107 being the negative terminal and the terminal 108 being the positive terminal. Pivotally mounted on the pivot pin 104 is a Y-shaped spring contact member 109, one leg of the Y designated as 109a comprising the detent finger, another leg of the Y designated as 109b comprising the contact finger and the third leg of the Y 109c comprising the actuating finger. The terminals 107 and 108 are suitably riveted to the insulating switch board by terminal pins 110 and 111, respectively, which depend from the terminal board and extend into the recess 33 in the lower end of the casing 26.

In order to actuate the switch defined by contact 109b and a stationary contact comprising part of terminal 107, there is provided a molded knob switch 113 having a finger actuating portion 113a which preferably is adapted to protrude through a suitable opening 114 in casing section 29, as best shown in FIGS. 2 and 8 of the drawings. The switch knob 113 is adapted to be pivoted about pivot pin 104 and includes on the underside thereof a suitable recess 116 to receive the actuating finger 109c of the Y-shaped spring contact 109, as clearly shown in FIG. 6 of the drawings. In order to hold the rotatable spring contact 109 and the switch knob 113 in assembled relationship with respect to pivot pin 104, a suitable curved spring washer 117 and a C washer 118 are provided in a manner well understood by those skilled in the art. When the detent finger 109a is in the detent 103b, as shown in FIG. 6 of the drawings, the contact 109 is out of engagement with terminal 107. When, however, contact 109 is rotated so as to move detent 109a into detent 103a, then contact 109b engages the terminal 107 and electrically interconnects terminal 107 and contact detent 103.

The electrical connections are best shown in FIG. 13 of the drawings where the corresponding parts are designated by the same reference numerals as in the other figures. As there illustrated, the negative terminal of the battery 31b is connected by suitable conductor 120 with the terminal 107. Similarly, the positive terminal of the battery 31a is connected by suitable conductor 121 to the terminal 108. Moreover, the terminal 108 is also connected by an electrical conductor 122 and a conductor 123, FIGS. 3, 6 and 13, with the positive terminal of motor 30. Similarly, the contact detent 103 is connected by a conductor 124 and a conductor 125 with the negative motor terminal of the motor 30. To complete the electrical circuit, the negative terminal of battery 31a is connected to the positive terminal of battery 31b by a conductor 126 thus connecting the batteries in series.

For illumination purposes and also to indicate when the switch controlling the motor 30 is closed, there is provided an electric lamp 129 connected in parallel with the motor 30. This lamp, as best shown in FIGS. 2, 3 and 4, is supported on a suitable bracket 130 secured to one of the pole pieces of the motor 30 by fastening means 131.

From the detailed description included above, the operation of the power unit 21 will readily be understood by those skilled in the art. When the switch comprising a movable spring contact 109b is closed, then the motor 30 is energized from the batteries 31a and 31b.

In order that the batteries 31a and 31b may be charged, there is provided the combined support and charging unit 22, best shown in FIGS. 1, 10, 11 and 13 of the drawings. As there illustrated, this unit comprises a molded plastic housing 130 having a generally closed top and an open bottom. In a device built in accordance with the present invention, a closed top was provided with a central depressed area 131 having an elongated opening 131a defined therein. A molded connector assembly designated at 132 comprises a pair of integral spaced apart projecting portions 132a and 132b which project above the top of the housing 130. The connector assembly 132 is preferably of molded plastic construction having molded therein a pair of female type contacts 134 and 135 spaced so as to be adapted to make electrical contact with the terminal pins 110 and 111, respectively, of the power unit 21 when projecting portions 132a and 132b are received within two openings 41 and 42 defined in the spring clip 38. The female contact 134 is illustrated as being in the projection 132a while the female contact 135 is illustrated as being in the projection 132b. The two projections 132a and 132b of the connector assembly 132 are of different size to insure the proper polarity of the connection between power unit 21 and unit 22. A recess 137 is provided in the projection 132a between contact 134 and projection 132b to receive the downwardly projecting portion 104a of the pivot pin 104. It should be appreciated that the depressed area 131 in the top of the charging unit housing 130 and the projections 132a and 132b receivable in the openings 41 and 42 provide a very satisfactory means for supporting the power unit 21 on the combined support and charging unit 22 and, of course, at the same time completing the charging connections between the terminals 110 and 111 and the corresponding female terminals 134 and 135, respectively.

For the purpose of holding the connector assembly in position, there is preferably provided a retainer member 139 secured by suitable fastening means 140 to the inside of the top of casing 130. The retainer is preferably provided with a channel-shaped portion 139a to accommodate power conductors 141 and 142 connected to the terminals 134 and 135, respectively.

To energize the female terminals 134 and 135 with a low voltage direct current capable of charging the batteries 31a and 31b, there is provided a transformer generally designated as 143 comprising a primary winding 143a and a secondary winding 143b, best shown in the schematic view of FIG. 13 of the drawings. In a device built in accordance with the present invention, the transformer 143 produced a secondary voltage of the order of two and eight-tenths volts at a charging current of between 0.05 and 0.06 ampere. The primary winding is, of course, connected by a conventional power cord designated as 144 to the conventional plug-in connector 145. The secondary winding 143b is connected to the conductors 141 and 142 through a suitable diode or rectifier 146. In order to hold the transformer 143 and associated rectifier 146 within the charging unit 24, there is preferably provided an insulating divider 148 dividing the chamber in housing 130 into two chambers, one a transformer chamber 149 and the other a storage chamber 150. A suitable closure member 151 is provided which is secured as by fastening means 152 to close the open lower end of the housing 130. Preferably, a portion of the closure member 151 designated at 151a comprises an integral hinged cover member by virtue of a restricted cross section 151b. The power cord 144 may be stored within the chamber 150.

It is apparent that whenever the power unit 21 is associated with the charging unit and the power cord 144 is connected to a source of alternating current the batteries 31a and 31b will be charged. By virtue of the different sizes of the openings 41 and 42 and the different sizes of the projections 132a and 132b of the connector assembly 132, the proper polarity is always assured with respect to charging the batteries. In view of the detailed discussion included above, the operation of the charging unit 22 will readily be understood by those skilled in the art. The exterior of the housing of the charging unit 22 is of a very pleasing appearance so that when the power unit 21 is associated therewith and the cover 23 is placed in position a very attractive device is provided which will be in the nature of an ornament when reposing on a dressing table, shelf or the like.

Electric shavers for women are used much less frequently than electric shavers for men, and it is possible that the operator might neglect to place the power unit 21 on the charging unit 22 so the batteries can be recharged, whereupon the batteries might eventually become discharged. Under such circumstances it would be desirable to provide means whereby the power unit 21 could be energized directly from an alternating current source to permit use thereof, after which the power unit could be associated with a charging unit to recharge the batteries. In FIG. 14 of the drawings there is illustrated schematically a modification of a charging unit designated as 155 which functions not only as a charging unit but which would also permit the power unit 21 to be operated directly from an alternating current source. In the latter case a special power cord interconnecting the power unit 21 and the charging unit 155 would be required. Such a special power cord is disclosed in FIG. 15 of the drawings and described briefly hereinafter.

The parts of the running and charging unit 155 corresponding to those of the charging unit 22 are designated by the same reference numerals, and where identical the description will not be repeated here. In the case of the charging unit 155 the secondary winding 143b of the transformer 143 is tapped at the midpoint and a conductor 156 connects this midpoint to a female type terminal 157 disposed in the recess 137 (FIG. 11) but displaced downwardly to a sufficient extent as shown in FIG. 14 of the drawings so that this female type terminal will never be engaged by the portion 104a of the pivot pin 104 when the power unit 21 is associated with the unit 155. A rectifier designated as 146' is provided, connected to the terminal 135 by the conductor 142. This rectifier is similar to the rectifier 146 but capable of carrying the motor current rather than only the charging current which is all that the rectifier 146 of charging unit 22 must carry. In a device built in accordance with the present invention this running current was of the order of one and one-half amperes. An additional rectifier or diode 158 is provided which is connected to the other terminal of the secondary winding 143b and by a conductor 159 to the female terminal 135, thus effectively providing full wave rectified current at terminals 135 and 157. In order that the unit 155 functions as a charging unit as well as a unit for supplying running current, the terminal 134 is connected to the midpoint of secondary winding 143b through a current limiting resistor 160 and a conductor 161. The current limiting resistor 160 is such as to limit the charging current to the order of between 0.05 and 0.06 ampere.

It will be apparent that if the power unit 21, as schematically shown in FIG. 13, is associated with the charging and running unit 155 of FIG. 14, and the switch comprising movable contact 109b is open, the batteries 31a and 31b will be charged through terminals 134 and 135, and the current limiting resistor 160 will maintain the charging current within the desired range. Since the terminal 157 does not engage the projection 104a, the former performs no function under such charging conditions.

In the event that the batteries 31a and 31b are discharged to the extent that they will not operate the motor 30, the user may operate the shaver without waiting for the batteries to recharge by utilizing the special cord unit 162 shown in FIG. 15 of the drawings permitting transformer operation of the motor 30. This cord comprises at one end a connector 163 having male terminals 163a and 163b engageable with the terminals 135 and 157, respectively, of the running and charging unit 155. A dummy terminal 163c receivable in female terminal 134 may or may not be provided. At the other end this special cord unit includes a connector 164 having female terminals 164a and 164b which electrically engage the terminal 111 and the projection 104a, respectively. A recess 165 for receiving the terminal 110 is provided. With this arrangement low voltage rectified current is supplied directly from transformer 143 to the motor 30. The closer spacing between the terminals 157 and 134 insures the proper orientation of connector 163 relative to unit 155. The use of such a special cord unit 162 permits the use of a very simple motor switch as described and allows the voltage limiting resistor 160 to be built into unit 155 rather than contained in power unit 21; otherwise a three position switch having settings for (1) battery operation of motor, (2) battery recharging and (3) transformer operation of motor would be required.

The projection 104a of power unit 21 is effectively a terminal which in addition to the function just described also provides one terminal for supplying current to the motor in power unit 21 during the manufacturing operation. In this way current consumption, for example, can readily be measured.

While there have been illustrated and described several embodiments of the present invention, it should be understood that various changes and modifications will occur to those skilled in the art and it is contemplated in the appended claims to cover all such changes and modifications as fall within the true spirit and scope of the present invention.

What is claimed as new and desired to be secured by Letters Patent of the United States is:

1. A rechargeable battery operated device including a charging assembly adapted to be connected to a source of alternating current electrical energy, means including a transformer and a rectifier in said charging assembly for converting said alternating current to a low voltage direct current, a projection from the top of said charging assembly defining three spaced aligned recesses, electrical terminals in two of said recesses connected to the output of said transformer and rectifier, a power unit including a casing and an electric motor disposed therein, a rechargeable battery within said casing, switch means for connecting said motor to said battery, cooperating terminal means on said power unit electrically connected to said battery, said terminal means being engageable with said terminals for electrically interconnecting said charging assembly and said batteries for charging the same, means on said power unit for receiving said projection and mechanically supporting said power unit on said charging assembly with said terminals and terminal means in engagement, first conducting means on said power unit receivable in said third recess, terminal means in said third recess disposed so as not to be engaged by said conducting means when said power unit is in charging position on said charging assembly, and second conducting means for interconnecting said motor and the direct current output from said transformer and rectifier including said first conducting means whereby said electric motor may be energized directly from said direct current output instead of from said battery.

2. In combination a rechargeable electric shaver including a casing enclosing a direct current electric motor and rechargeable battery means connected to said motor, terminal means on said shaver connected to said motor and said battery means, a base enclosing a charging unit adapted to be connected to a source of alternating current electrical energy, said charging unit including circuit means for converting said alternating current to low voltage direct current, terminal means on said base connected to the output of said circuit means, support means defined by said base for supporting said shaver with the terminal means on said shaver and the terminal means on said base in operative engagement for charging said battery means, and cord means for interconnecting said terminal means on said shaver with said circuit means in said base for driving said motor with low voltage direct current from said charging unit.

References Cited

UNITED STATES PATENTS

| | | | |
|---|---|---|---|
| 3,329,881 | 7/1967 | Tolmie | 320—2 |
| 3,192,378 | 6/1965 | Oldenburger | 320—2 |
| 3,257,599 | 6/1966 | Somers et al. | 320—2 |
| 3,257,600 | 6/1966 | Tolmie | 320—2 |

LEE T. HIX, *Primary Examiner.*

S. WEINBERG, *Assistant Examiner.*